United States Patent [19]

Douglass et al.

[11] 4,330,174
[45] May 18, 1982

[54] FAIL-SAFE FIBER OPTIC PUSHBUTTONS, DISPLAYS, AND SYSTEMS EMPLOYING THE SAME

[76] Inventors: Howard S. Douglass, 10053 Aspen La., Windsor, Ontario, Canada, N8R 2B7; Brian G. Fox, R.R. #1, Dover Centre, Ontario, Canada, N0P 1L0

[21] Appl. No.: 132,305

[22] Filed: Mar. 20, 1980

[51] Int. Cl.³ ............................................. G02B 5/14
[52] U.S. Cl. ................................ 350/96.23; 340/380
[58] Field of Search ........................... 340/365 P, 380; 250/227; 350/96.23

[56] References Cited

U.S. PATENT DOCUMENTS

| | | | |
|---|---|---|---|
| 3,498,286 | 3/1970 | Polanyi | 350/96.23 |
| 3,758,951 | 9/1973 | Scrivo | 350/96.23 |
| 3,818,369 | 6/1974 | Brocker | 340/365 P |
| 3,851,328 | 11/1974 | Sottile | 340/365 P |
| 3,937,952 | 2/1976 | Ripley | 340/365 P |
| 4,088,387 | 5/1978 | Lewis | 250/227 |
| 4,095,217 | 6/1978 | Tani | 340/765 |
| 4,185,887 | 1/1980 | Ferrentino | 350/96.23 |

Primary Examiner—Harold I. Pitts
Attorney, Agent, or Firm—Larson and Taylor

[57] ABSTRACT

A method of incorporating at least one fiber tube into a plastic pipe, such that the pipe becomes useable for carrying optical signals along the fiber optic tube as well for carrying a fluid such as water. The fiber optic tube is affixed to the wall of the plastic pipe during extrusion of the latter and in a first embodiment, the fiber optic tube is extruded with the pipe. In a second embodiment, the fiber optic tube is secured to the pipe when the pipe is in a heated state after extrusion.

5 Claims, 9 Drawing Figures

FAIL-SAFE FIBER OPTIC PUSHBUTTONS, DISPLAYS, AND SYSTEMS EMPLOYING THE SAME

BACKGROUND OF THE INVENTION

This invention relates to fibre optics, particularly to fail-safe mechanical fibre-optic switching devices, fibre optic displays, and integrated systems of fibre optic control.

The invention thus relates to the precise control of electrical and electronic devices and systems by non-electric means, the said non-electric means being connected solely by optical fibres to the device or system being controlled. The said non-electric means, consisting of both fibre optic switches and displays, are integrated together with the said optical fibres and appropriate electronics to form systems having complete, electrically remote, control consoles.

Such electrically inert and electrically remote control consoles will have important advantages in a number different environmental conditions: wetness, high electrical noise, or the explosive atmosphere found in many industrial situations. Each of these conditions eliminates or makes very expensive the use of electrical control consoles. While it is true that pneumatic controls can be used, these are bulky, have more moving parts, and require considerable complexity to convey much precise information accurately.

It is an object of the present invention to provide systems which can do this much more simply by fibre optic means.

SUMMARY OF THE INVENTION

The foregoing and other objects which will be apparent to those having ordinary skill in the art are achieved in accordance with the present invention by:

(a) providing a path through the optical switch means which is open only when the pushbutton is depressed.

(b) optionally providing a second path through the switch in addition to the first, which is open only when the pushbutton is not depressed.

(c) providing optical control means for generating a control signal, said means consisting of light source means, light detector means, and fibre optic tube means for converging light from said light source to said switch, and from said switch to said light detector means.

(d) providing electronic means whereby said control signals increment or decrement digitally stored variables.

(e) providing numbered light sources responsive to said digitally stored variables.

(f) providing fibre optic tube means for conveying light from said numbered light sources to number indicating positions on the console.

(g) alternatively to (e) and (f), providing a frequency generating means responsive to said digitally stored variable, light source responsive to said generating means, fibre optic tube means for conveying said light to console, sealed means at console for displaying number corresponding to frequency, said sealed means to consist of light detecting means, low voltage generating means responsive to ambient light, frequency decoding means, and low power digital display means.

(h) providing, for simple control functions, a toggling means, relay means and light source means responsive to state of said toggling means, fibre optic tube or bundle means of conveying light from said light source to indicator position on panel, and electrical means of conveying power from relay to appliance or motor to be controlled.

(i) providing a method of manufacture whereby optical fibres are permanently placed in or on the wall of a plastic pipe, should this be warranted by the involvement of fluids, by strength considerations, or by other considerations such as simplicity or cost.

BRIEF DESCRIPTION OF THE DRAWINGS

The invention will be further understood with reference to the following detailed description, which includes a description of several embodiments illustrated in the drawings in which.

DETAILED DESCRIPTION OF THE PREFERRED EMBODIMENTS

Figure 1:
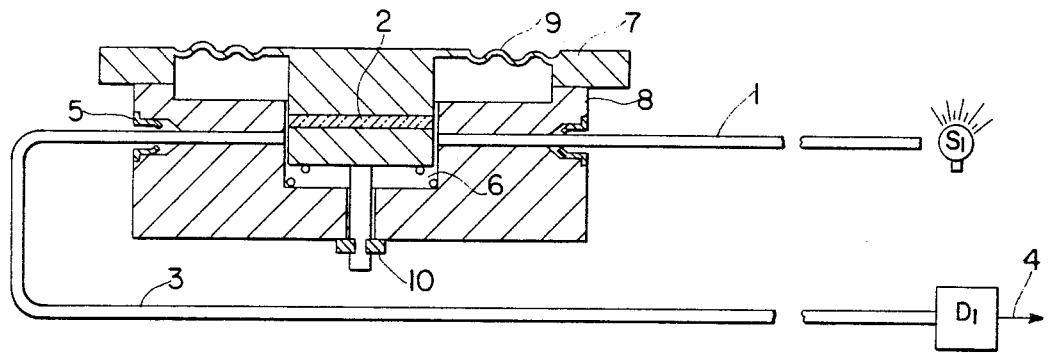
FIGS. 1 and 2 are two embodiments of the said optical switch means pertaining to the invention.

With reference to FIG. 1, apparatus according to the invention is illustrated for switching fibre-borne light in a fail-safe manner, that is, in such a manner that failure of the light source does not cause switching to occur. Fibre optic tube means 1 carries light into the switching apparatus from the remote source $S_1$, which is preferably a light emitting diode, due to the low cost, low power consumption, and long life of the same. A further fibre optic tube means 3 carries light from the switching apparatus to the detector $D_1$, when the top center of the apparatus is depressed causing fibre optic tube means 2 to line up with fibre optic tube means 1 and 3. Fibre optic tube means 1, 2, and 3 are all preferably single fibres of large diameter, e.g. 0.040", to obviate critical alignment problems. Fibre optic tube means 1 and 3 are preferably jacketed to prevent outside light interference. A control signal 4 is thus passed to the electrical system if and only if the source $S_1$ is operating, and the top center of the apparatus is depressed against the compression spring 6. The top of the apparatus 7 is preferably injection molded plastic. The body 8 is preferably injection molded or machined, and preferably ultrasonically welded to the top 7. A thin corrugated region 9 increases the flexibility of the pressure sensitive area; an outer limit to this flexing is provided by the C-ring 10. In the body 8, the fibre optic tube means 1 and 3 are held by tube holding means 5, preferably a ring allowing insertion but not withdrawal, preferably formed by precision metal stamping.

Figure 2:
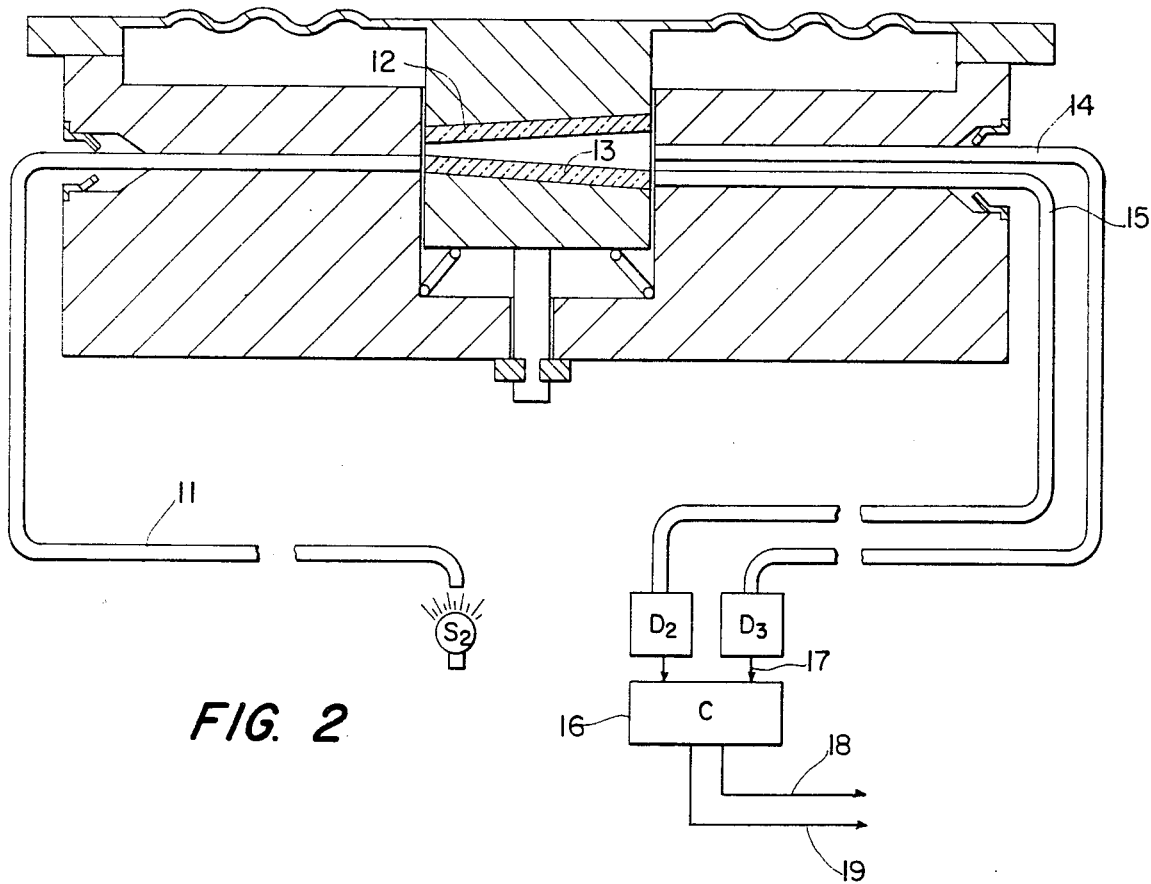

With reference to FIG. 2, the apparatus illustrated in FIG. 1 is modified for those situations in which a light source failure must be signalled before a failure to switch occurs. The modification consists in replacing the fibre optic tube means 3 leading to detector $D_1$, with two fibre optic tube means 14 and 15, respectively, slightly above and slightly below the level of fibre optic tube means 11 from the light source $S_2$.

The modification consists further in replacing fibre optic tube means 2 with two fibre optic tube means 12 and 13, angled as indicated so that light from fibre means 11 is conveyed only to fibre means 14 if the top center is depressed, and is conveyed only to fibre means 15 if the top center is not depressed. The final modification consists in electronically comparing the signals from the light detecting means $D_2$ and $D_3$ to generate an on-off signal, and also an alarm signal should equal signals from $D_2$ and $D_3$ persist, as would be the case in the event of a light source failure.

Figure 3:
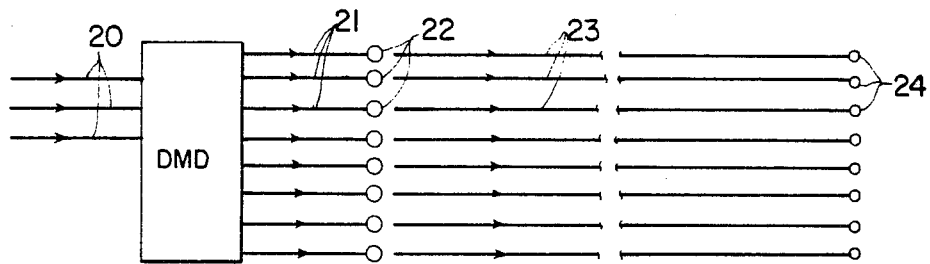
FIGS. 3, 4, and 5 are three embodiments of the display means pertaining to the invention.
Figure 4:
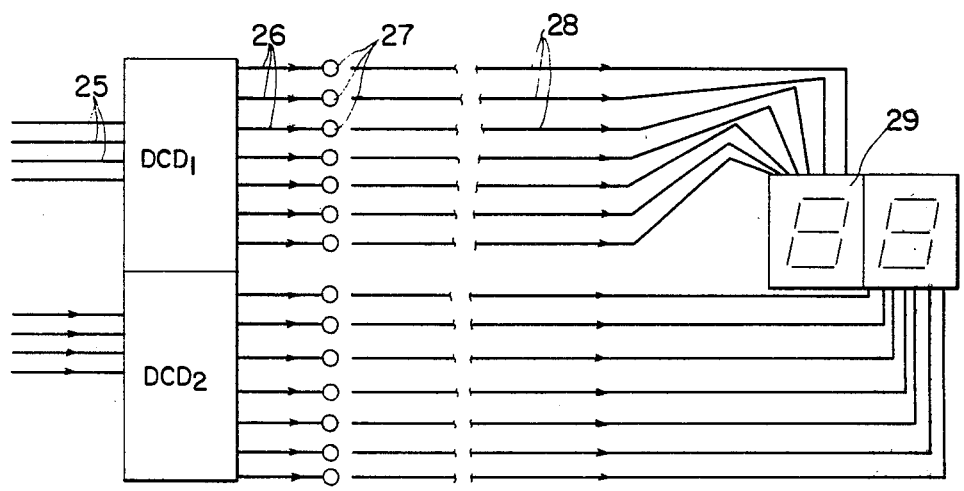

FIGS. 3 and 4 illustrate means of fabricating remote, electrically inert, displays. In FIG. 3, a binary input number signal 20 is passed to de-multiplexing and driving means DMD, so as to power the appropriate light source 22, preferably a high intensity LED. Fibre optic tube means 23 carry this visual signal to the position on the panel representing the said input number.

FIG. 4 illustrates a means of displaying variables of any desired precision. Two binary-coded decimal integers as shown inputted into two decoding and driving means $DCD_1$ and $DCD_2$ but any number of integers could be handled by this method. The decoding and driving means powers the appropriate light sources 27, so that the fibre optic tube means 28 light the approprate segments of the 7-segment display 29. The fibre optic tube means 28 may be either a single fibre flattened at the end to form a bar segment, or it may be several fibres arranged at the end to form a row segment.

Figure 5:
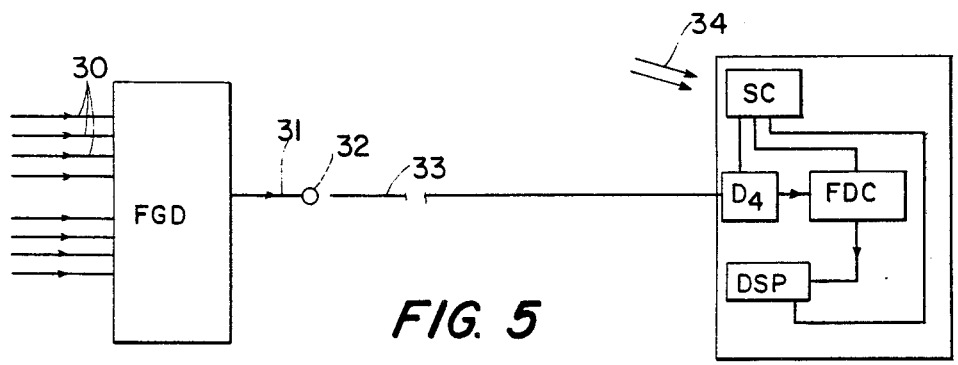

FIG. 5 illustrates an alternative means which is not quite electrically inert, but does have the advantage of requiring only one fibre, and is still electrically remote. The binary-coded decimal input number signal 30 is passed to a frequency generating device FGD, so that the light source 32 flashes at a frequency determined by the input number. Fibre optics tube means 33 carries this optical signal to a detector $D_4$, resulting in an electrical signal, which is used by the frequency decoding means FDC to generate the original input number which is then passed to the display DSP, preferably a low-power LCD. The detector $D_4$, frequency decoding meand FDC, and the preferably digital display DSP are all powered by a solar call or cells SC, responsive to ambient room light, all four of these devices being hermetically sealed in a single package.

Figure 6:
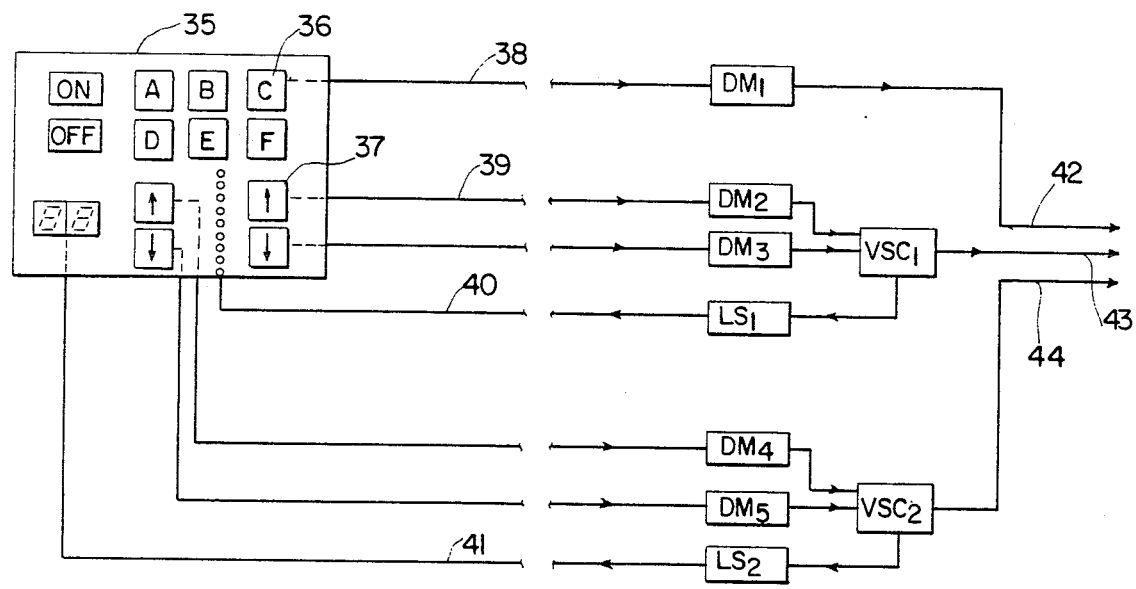
FIG. 6 is a possible embodiment of the total invention.

With reference to FIG. 6, an example of a complete electrically remote, and optionally electrically inert, control console 35 is illustrated. The "on", "off", and lettered pushbuttons are all fibre optic switching devices as illustrated in FIG. 1 and FIG. 2. Pushbutton 36 is typical, being connected by fibre optic tube means 38 to a remote source and detecting means $DM_1$, which passes a signal 42 to the electronic system to be controlled. The pushbuttons with arrows behave in the same way, except that the signal is passed to variable setting circuits $VSC_1$ and $VSC_2$, which have the effect of raising or lowering control variables to be input to the electronic system. Note that the variable number thus set is also passed to fibre optic display means $LS_1$ and $LS_2$, where $LS_1$ represents the display apparatus of FIG. 3 and $LS_2$ represents the display apparatus of FIG. 4 or FIG. 5. Signal 42 thus represents any number of on-off signals; signal 43 represents an input variable requiring only a few levels; signal 44 represents an input variable which can be set to any required degree of precision.

Figure 7:
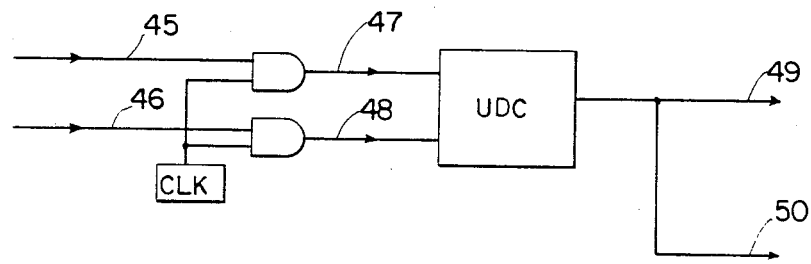
FIG. 7 is an embodiment of the said electronic means whereby said control signals increment or decrement digitally stored variables.

The operation of the variable setting circuits $VSC_1$ and $VSC_2$ is very simple, as illustrated in FIG. 7. Signal 45, from detecting means $DM_2$, is low except when the "up" optical switch is depressed, at which time the "and" gate with the clock CLK generates a series of pulses 47 into the "up" pin of the up-down counter UDC. Similarly, depressing the "down" optical switch results in a series of pulses 48 into the "down" pin of the up-down counter. The number stored in the up-down counter, or cascaded counters, is thus raised or lowered by an amount proportional to the time that the "up" or "down" optical switch is depressed. This number is passed instantaneously to the fibre display means and to the electronic system by signals 49 and 50.

Figure 8:
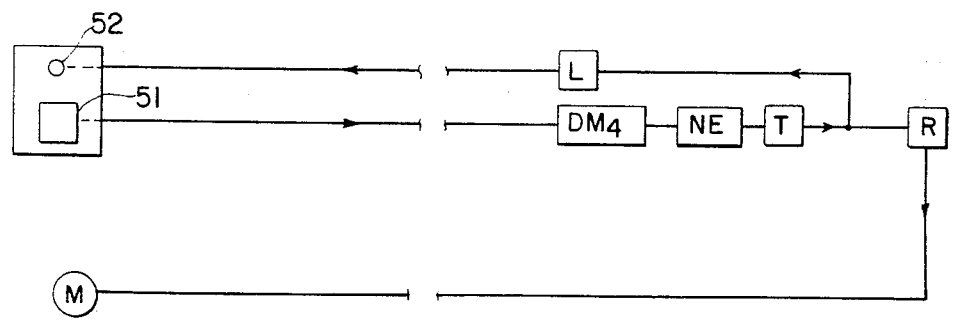
FIG. 8 is an embodiment of the invention pertaining to a very simple control function.

With reference to FIG. 8, a very simple application of the fibre optic switch is illustrated, namely, an electrically inert, remote switch 51 with indicator light 52, for power switching, for example for safely switching the motor in a whirlpool bath. A signal from the fibre optic switching device is converted to an electrical signal by detecting means $DM_4$, passed through noise eliminating means NE to toggling means T, so that the state of said toggling means is reversed each time the fibre optic switching device is pressed. A signal indicating the state of said toggling means is passed to a light source L, connected by fibre optic tube means to the indicator beside the switch, and to relay means R for switching the power to the appliance or motor M on or off.

Figure 9:
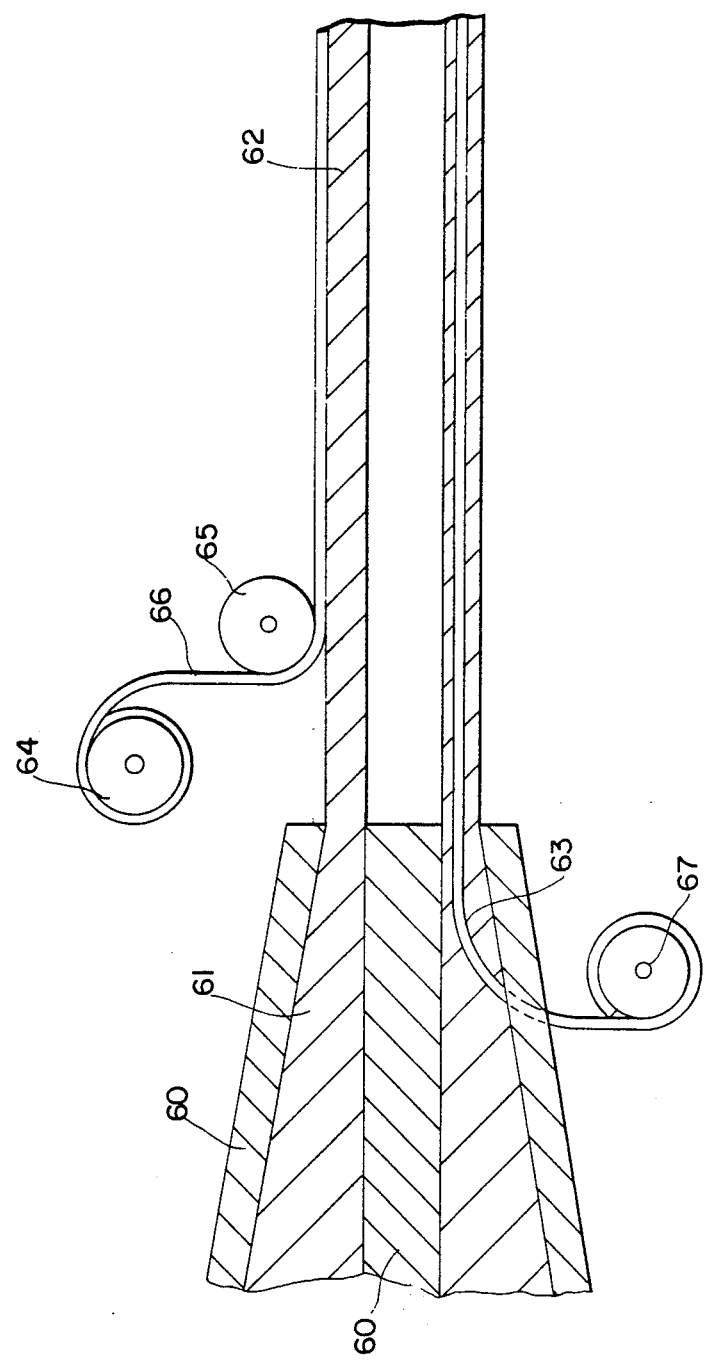
FIG. 9 illustrates methods of permanently placing optical fibres in or on the wall of a plastic pipe, at the time of extrusion of the pipe.

With reference to FIG. 9, methods are presented for incorporating optical fibres into plastic pipe at the time of extrusion of said pipe. According to the first method, after the hot plastic 61 is extruded from the machine 60, fibre optic tube means 66 from a roll 64 is pressed by roller 65 onto the hot plastic pipe 62.

Adhesion of the fibre optic tube means onto the plastic pipe may or may not be enhanced by the use of hot glue applied to the fibre optic tube means 66. According to the second method, the fibre optic tube means 63 is unwound from a roll 67 into the extruding machine 60 so that the plastic pipe thus formed, includes the fibre optic tube means as part of the wall.

What is claimed is:

1. A method for producing a plastic pipe capable of transmitting optical signals as well as for carrying a fluid such as water therein, said method comprising:
   extruding a plastic hollow tube to form a plastic pipe capable of carrying fluid therein; and
   simultaneously with the extruding of said plastic tube, affixing at least one fiber optic tube to the wall of said plastic tube such that the fiber tube becomes a permanent integral part of the plastic pipe formed from the plastic tube.

2. A method as claimed in claim 1 wherein said fiber optic tube is fed to an extruder for extruding the plastic tube and is incorporated in the wall of said plastic tube during the extrusion of the plastic tube.

3. A method as claimed in claim 1 wherein said fiber optic tube is affixed to the outer surface of the wall of the plastic tube directly downstream of the point of exit of the plastic tube from an extruder used in extruding the plastic tube while the plastic forming the plastic tube is still hot so that the fiber optic tube is thereafter permanently secured to said plastic pipe formed by plastic tube.

4. A method as claimed in claim 3 wherein said fiber optic tube is affixed to said plastic tube using heat from the plastic forming the tube and pressure applied by a roller.

5. A method as claimed in claim 4 wherein an adhesive is used to insure adherence of said fiber optic tube to said plastic pipe.

* * * * *